METHOD AND APPARATUS FOR DATA CONVERSION

Filed Aug. 5. 1966

INVENTORS
Guy O. Buckner
Mike Davis

BY William E. Johnson, Jr.
ATTORNEY

METHOD AND APPARATUS FOR DATA CONVERSION

Filed Aug. 5, 1966 3 Sheets-Sheet 2

INVENTORS
Guy O. Buckner
Mike Davis
BY
William E. Johnson, Jr.
ATTORNEY

METHOD AND APPARATUS FOR DATA CONVERSION

Filed Aug. 5, 1966

INVENTORS
Guy O. Buckner
Mike Davis

BY William E. Johnson Jr
ATTORNEY

3,393,403
METHOD AND APPARATUS FOR DATA CONVERSION

Mike Davis and Guy O. Buckner, Houston, Tex., assignors to Dresser Industries, Inc., Dallas, Tex., a corporation of Delaware Filed Aug. 5, 1966, Ser. No. 570,629
17 Claims. (Cl. 340—15.5)

ABSTRACT OF THE DISCLOSURE

A data chart having non-magnetic lines is traced with magnetic ink. The chart is traversed past a rotating disk having magnetic sensors connected to circuitry providing an analog voltage proportional to the position of the magnetic lines on chart. The associated circuitry allows independent control of zero reference and scan width. Electric lamps on the disk provide visual indication that magnetic lines is being followed.

This invention relates to an apparatus and method for the conversion of recorded data. More particularly, it relates to the conversion of analog film strips to magnetic film strips, to methods and means for scanning and detecting the magnetic information stored therein, and to means for the conversion of the detected magnetic information into electrical signals.

The advent of digital and analog computers has resulted in new methods for recording data which are somewhat compatible with machine input mechanisms. However, there has remained a problem of converting old data into electrical signals which can be put into a computer. The prior art has included such means and methods as pantographs, manual curve followers, electrical photocell curve followers, photocell scanners and cathode ray tube raster type curve sensors, all of which have had, at best only limited success. Pantographs, being instruments having essentially four light rigid links jointed in parallelogram form to copy maps, plans, or the like, and other manual curve followers are limited by the ability of the operator. Manual curve followers are further characterized as being generally useful only for one curve due to the confusion associated with a plurality of curves, especially with curves which intersect or overlap. The electric photocell curve followers have had a limited amount of success, but have sometimes tended to stray from the curve at abrupt changes in curvature or at intersections with other curves, lines or marks on the chart. Photocell scanners, while not generally having the limitations associated with photocell curve followers, quite often record too much data for a reasonable length computer program to sort. This sorting aspect can become quite burdensome in the removal of depth lines, vertical lines, previously written pencil calculations on the chart and various other marks or lines which will be reproduced by a photocell scanner. While these types of extraneous marks or lines are characteristic of geophysical logging data, it should be appreciated that they are merely exemplary of the many unwanted marks or lines which tend to be found on nearly all forms of data. The cathode ray tube raster type curve sensor, while being listed separately above in the discussion of the prior art, does require some manual guidance, and is relatively slow in operation.

It is therefore a primary object of this invention to provide a method for the conversion of non-magnetic data to magnetic data;

It is another object of the invention to provide a system for the conversion of magnetic data lines to electrical signals;

It is another object of the invention to provide a system for scanning and detecting magnetic data;

It is still another object of the invention to provide rotating means having magnetic sensors mounted thereon for scanning magnetic data;

It is yet another object of the invention to provide means for indicating a proper operation of the magnetic sensors;

It is a further object of the invention to provide a system for scanning and detecting magnetic data having improved zero reference and span-setting characteristics;

It is another object of the invention to provide a system for scanning and detecting magnetic data wherein said system has audio correlation.

The objects of the invention are accomplished, broadly, by selectively tracing non-magnetic curves or lines with magnetic ink. The chart or film having the data thereon is then passed over rotating means, for example, a disk, the disk having magnetic sensors thereon to thus scan the lines or curves. The sensors are connected to unique electronic circuitry to produce a variable output analog voltage indicative of the curve or line being sensed. The associated circuitry allows independent control of the zero reference setting and the scan width. Illumination means, for example, electric lamps, are located on the rotating means near the magnetic sensors to indicate that the magnetic ink curve is being located during the scanning sequence.

A unique line sensor and its associated circuitry provide an audio signal to an operator to provide audio correlation.

A zero reference mechanism is provided which allows adjustment while the system is being operated, the mechanism operating off a magnetic reference material not physically located on the chart, but having an effective illuminated indicator on the chart.

These and other objects, features and advantages of the present invention will be apparent from the following detailed description taken with reference to the figures of the accompanying drawings, wherein the same or similar reference characters illustrate the same or similar parts:

Figure 1:
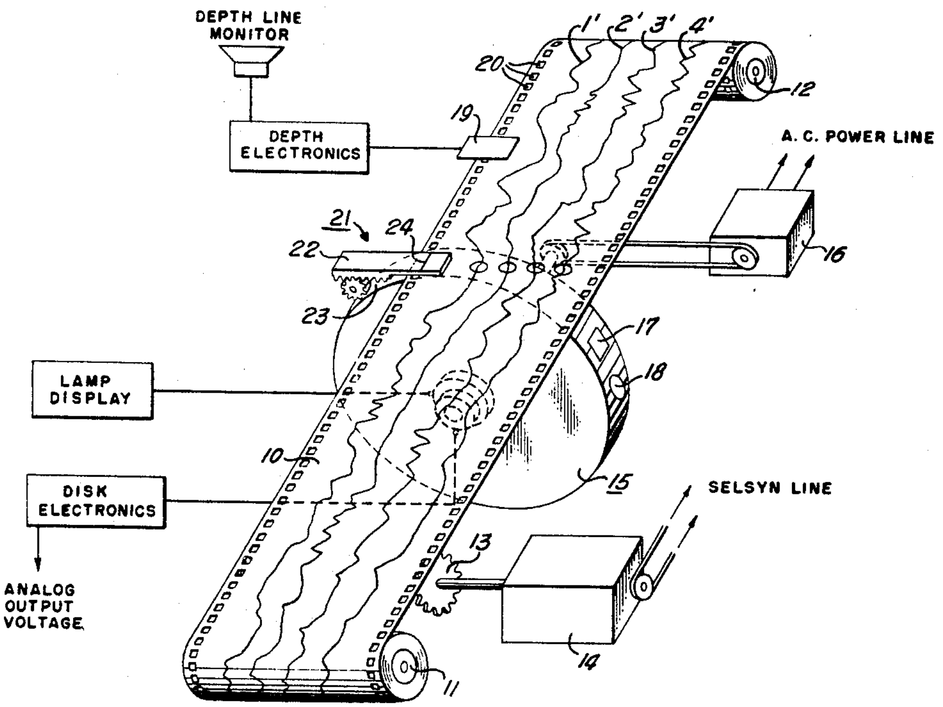
FIGURE 1 illustrates a pictorial view of the apparatus according to the invention, having portions of the electronics therein in block diagram.

In the form of the present invention chosen for purposes of illustration in the drawings, FIGURE 1 shows a pictorial view of the apparatus according to one embodiment of the invention. A data chart 10, for example, an analog film strip having some number of magnetic lines of data thereon, is caused to be transported between the take-up roll 11 and the supply roll 12. For ease of illustration, there are four data lines, 1′, 2′, 3′ and 4′, but it should be appreciated that the number of lines is only incidental to the features of the invention. At some point in the process according to the invention, prior to the scanning sequence, the non-magnetic lines 1, 2, 3, and 4 are traced with magnetic ink to result in the magnetic lines 1', 2', 3', and 4'.

Magnetic ink, being commercially available from printer ink supply houses, is available for the preferred embodiment from Sinclair and Valentine Company, Houston, Tex., under the name Black Magnetic Ink LPC-2230-228. Various other magnetic inks are useful in practicing the invention, for example, a mixture of ink and powdered iron oxide.

The chart 10 is transported between roll 11 and roll 12 by means of a driving drum 13 and a motor-gear box combination 14. In the preferred embodiment, the combination 14 is a selsyn motor and gear box, especially useful with geophysical logging data, being driven by a selsyn line to correlate the data with the depth of a borehole. A scanning rotating means 15, for example, a disk or drum, is oriented beneath the chart 10 with the axis of rotation approximately parallel to the longitudinal axis of the chart, being caused to rotate at 300 r.p.m. by an AC motor 16. The disk 15, shown in a sectional schematic view in FIGURE 2, has at least one, and preferably a number of, magnetic sensors thereon for detecting the magnetic ink lines 1', 2', 3', and 4'. Closely spaced to the sensors 17 are a number of electric lamps 18, the lamps being activated by circuitry to be described hereinafter which indicate to an operator that the curve is being followed by the system during the scanning sequence. The lamps used are conventional, for example, General Electric #682. A line sensor 19, for example, a photocell and a light (neither of which are illustrated) which are placed on opposite sides of the chart, is used to follow the depth line indicators 20, for example, holes or clear areas in the chart 10. The associated audio monitoring circuitry is described hereinafter with respect to FIGURE 6 of the drawings.

One of the features of the invention is the zero reference adjust mechanism 21, having adjustable, for example, gear driven, means 23 therein, whereby the magnetic line 24 can be moved across the chart 10, the mechanism 21 being independent of the movement of the rotating disk 15. A light spot appearing on the chart provides an indication to the operator of the location of the reference line information which is being fed into a computer (not illustrated) along with the other data. As will be discussed in more detail hereinafter, because of the delay circuitry which compensates for the mechanical displacement between the desired location of the reference line and magnetic line 24, the light spot which is visible to the operator is the effective location of the zero reference line. It should therefore be appreciated that the mechanism 21 makes possible a reference material which is off the chart to provide an effective reference as if it were on the chart. While a single reference line 24 is illustrated, it should likewise be appreciated that a plurality of magnetic lines could be provided either on the single non-magnetic block 22 or on a plurality of blocks to supply a plurality of reference lines to the computer if so desired.

Figure 2:
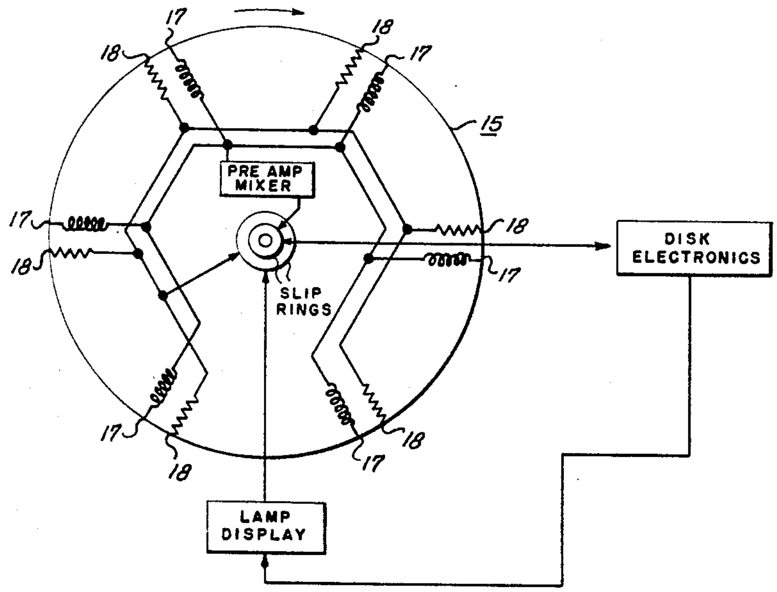
FIGURE 2 illustrates a sectional schematic view of the rotating disk according to the invention, having portions of the electronics associated therewith in block diagram.

FIGURE 2 of the drawings shows a sectional schematic view of the rotating member 15. A plurality of magnetic sensors 17, for example, induction coil devices well-known in the art, are located on the surface of the disk 15. The sensors in the preferred embodiment, while not fully illustrated, are described in Magnetic Recording Techniques by Stewart, pp. 93-95, published by McGraw-Hill Book Co. in 1958, under the heading of Variable-reluctance Heads (see specifically FIGURES 3-23 in the publication). Near each of the sensors an illuminating means 18, for example an electric lamp, is placed also on the surface of the disk. As shown in FIGURE 1, the disk is rotated beneath the chart 10 so that the magnetic sensors are scanning the magnetic reference line 24 and the magnetic data lines 1', 2', 3', and 4'. The signals which are derived from the reference line 24 and the data lines 1', 2', 3', and 4' pass through the preamplifier mixer circuitry, through mechanical slip rings in the disk, into the disk electronics illustrated in FIGURE 3. The signals then activate the lamp circuitry which in turn, through mechanical slip rings in the disk, cause a light spot to appear directly under the lines 1', 2', 3', and 4', the delay circuitry compensating for the mechanical displacement between the sensors 17 and the lamps 18. It should be appreciated that while the disk has been illustrated as rotating clockwise and the sensors oriented as illustrated with respect to the lamps, the rotation could be counter-clockwise and other orientations of the sensor-lamp combinations are within the scope of the invention.

Figure 3:
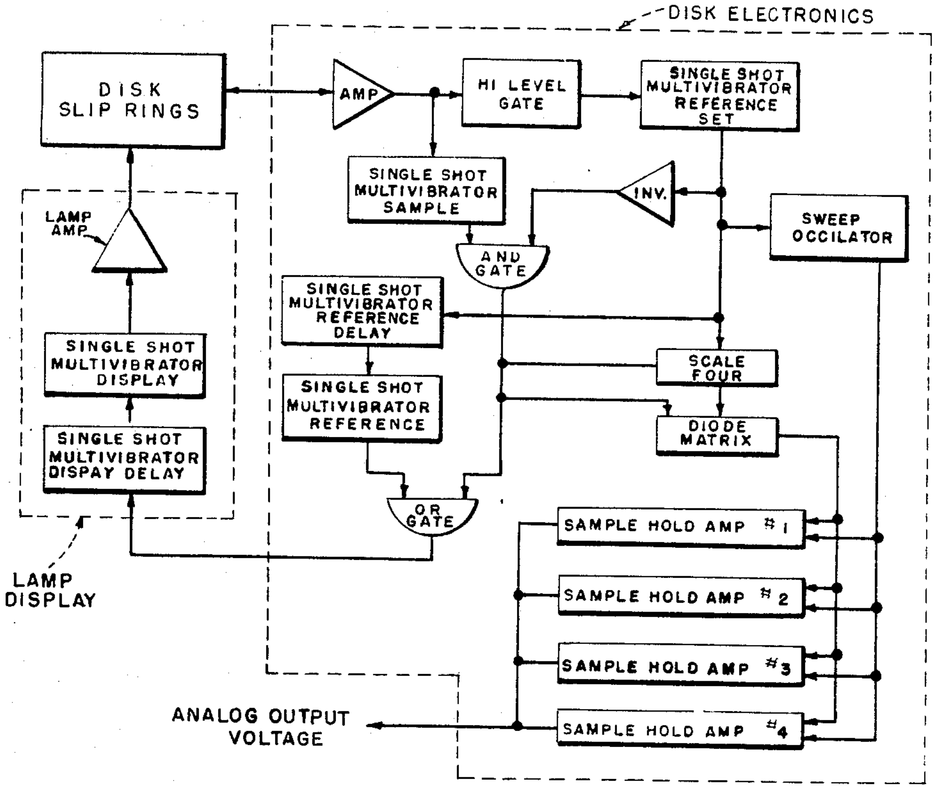
FIGURE 3 is a block diagram of the disk electronics and lamp display electronics according to the invention.
Figure 4:
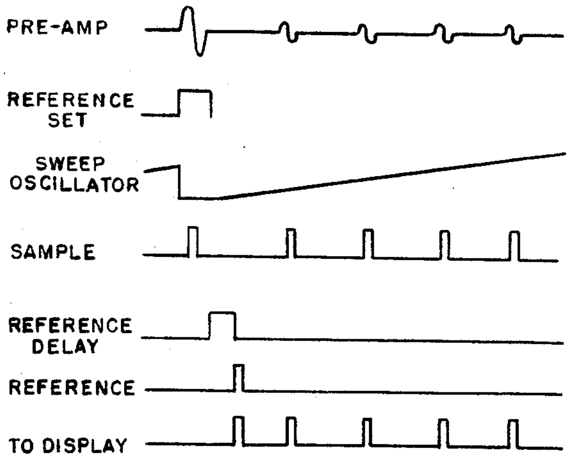
FIGURE 4 illustrates wave forms and time relationships between the wave forms in the disk electronics according to the invention.

FIGURE 3 of the drawings shows a block diagram of the disk electronics and lamp display electronics shown in less detail in FIGURE 2, while FIGURE 4 illustrates some of the typical waveforms. As the disk rotates, the large reference signal and the smaller signals from the curves 1', 2', 3', and 4' pass from the slip rings to a first amplifier. The reference signal, being stronger because of the heavier magnetic line 24, is separated from the smaller data signals by a high-level gate or discriminator. After passing through the high-level gate, the leading edge of the reference signal triggers the "Reference Set" single shot multivibrator, the output of which has a leading edge which sets down the sweep oscillator and a trailing edge which releases the sweep oscillator. The "Reference Set" also sets the "Scale Four" to zero. While the scale illustrated is a "Scale Four," this is merely exemplary of a scale or counter system well-known in the art, the number four being chosen since there are four lines of information (four data lines in addition to the reference line). Thus a larger number of lines would require a scaler of correspondingly higher number. Negative going signals, including the reference signal and the smaller data signals, from the amplifier illustrated adjacent the slip rings trigger the "Sample" single shot multivibrator. The inverted "Reference Set" signal and the "And" gate exclude the reference signal sample pulse from going further in the system. The trailing edge of the "Reference Set" output triggers the "Reference Delay" single shot multivibrator. The trailing edge of the output of the "Reference Delay" triggers the "Reference" single shot multivibrator, the output of which is fed into an "Or" gate, along with the output signals from the aforementioned "And" gate. The output of the "Or" gate is transferred to the "Lamp Display" section of the electronics, to be discussed hereinafter. The output of the "'And" gate is also connected to drive the "Scale Four" section and the "Diode Matrix," the "Scale Four" section also being connected to the "Diode Matrix." The conventional "Diode Matrix" drives each of four sample hold amplifiers labeled as amplifier #1, #2, #3, and #4. The sweep oscillator output is also fed into each of these sample hold amplifiers, the outputs of which deliver an output analog voltage for each curve being scanned and for the zero reference line.

During the time of a sample pulse, a sample hold output amplifier (illustrated in more detail in FIGURE 5) is in the sample mode because the input gating means, switch 50, is closed. This switch closure samples the amplitude of the sweep oscillator. At times other than that of the sample pulse, the output of the previous sample from that same curve is held. The trailing edge of a sample pulse advances the "Scale Four" section to the next number, whereupon the diode matrix will route the next sample pulse to the next sample hold output amplifier.

Figure 5:
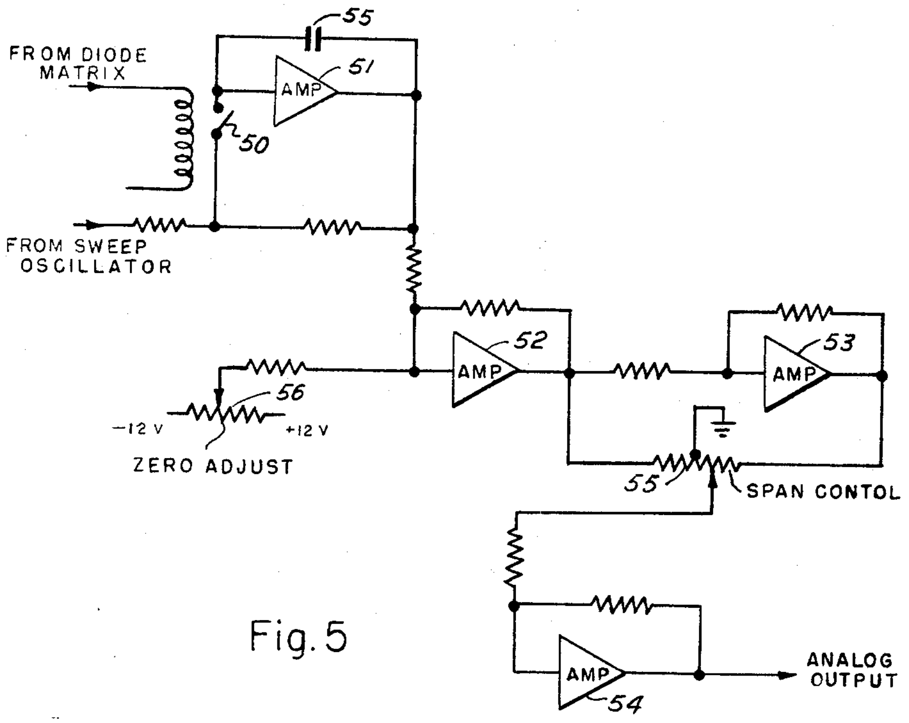
FIGURE 5 is a detailed representation of one of the sample hold amplifiers as illustrated in FIGURE 3.

As illustrated in FIGURE 5 of the drawings, operational amplifier 51 is the sample hold section of the output. The sampled voltage from the sweep oscillator is held on capacitor 55 in conjunction with amplifier 51. Operational amplifier 52 acts to sum or balance out the sweep oscillator voltage at a point which can be called zero. Operational amplifier 53 acts as an inverter stage for the signal from amplifier 52. The respective outputs of amplifier 52 and amplifier 53 are connected to opposite ends of a center-tapped potentiometer 55 serving as a span adjustment control for the given curve being spanned. Thus the sweep oscillator level may be positive or negative with respect to zero and the span set for a positive output. Amplifier 64 acts as an isolation amplifier for the output for that particular sample hold amplifier stage. The input to amplifier 52 is also connected to potentiometer 56 which is connected across a bias supply voltage, for example, 12 volts, thus providing a zero adjust for the particular sample hold amplifier stage. Because the operational amplifiers are so connected, the span control and zero adjust are independent of each other.

Figure 6:
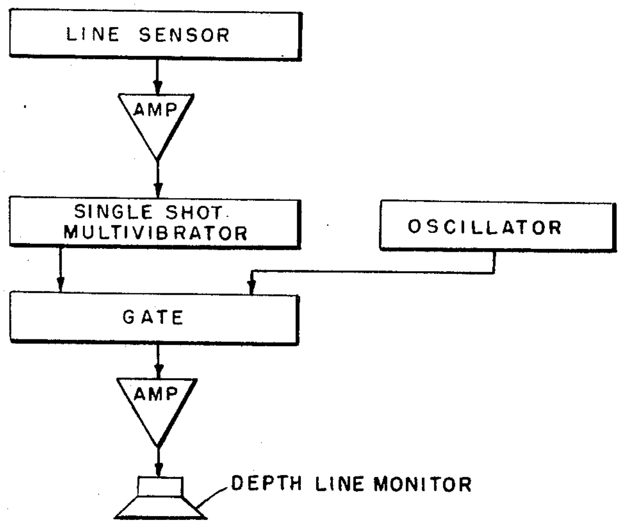
FIGURE 6 is a block diagram of the electronics associated with the audio depth signals according to the invention.

FIGURE 6 illustrates a block diagram of the circuitry associated with the audio monitoring system which aids an operator to adjust the chart or other parts of the system should there be slippage in the sprocket-driving drum combination as illustrated in FIGURE 1. The photo-cell (line sensor) signal, after passing through an amplifier stage, triggers a single shot multivibrator, which in turn gates the audio oscillator stage. The audio signal is then amplified to drive a speaker, identified as a depth line monitor.

The dotted line portion of FIGURE 3, labeled "Lamp Display," illustrates in a block diagram how the signals from the "Or" gate trigger a "Display Delay" single shot multivibrator which then triggers a "Display" single shot multivibrator, the delay allowing the light to rotate to where the magnetic ink sensor was when it was directly under the magnetic curve; thus the light is pulsed directly under the curve. While the physical displacement between the magnetic sensor and the lamp and the rotational velocity are determinative of the delay needed, a typical example would be a displacement of one centimeter, a rotational velocity of 250 centimeters per second, and a computed delay of 4 milliseconds.

The embodiments above described have been developed for use primarily with geophysical well-logging data, wherein bore-hole depth is important, thus accounting for the selsyn driven motor depth line monitor and the line sensor features. However, it will be apparent that other arrangements are possible without departing from the spirit and scope of the invention. Other variations of the components of the basic system will be apparent to those skilled in the arts, and for this reason the invention should only be limited to the extent of the appended claims.

What we claim is:

1. A system for converting magnetic lines on a data chart to analog voltages comprising:

(a) rotating means having at least one magnetic sensor mounted thereon;

(b) means for transporting said chart in proximity to said rotating means along an axis approximately parallel to the axis of rotation of said rotating means, whereby said at least one magnetic sensor scans each of said magnetic lines it a transverse manner during each rotation, the successive transversals of each line following along the longitudinal axis of said chart; and (c) circuit means for converting the electrical signals induced in said at least one magnetic sensor into a series of analog voltages for each of said magnetic lines.

2. The system according to claim 1 wherein said rotating means comprises a disk.

3. The system for use with geophysical well logging according to claim 2 wherein said means for transporting said chart comprises a selsyn line-driven motor and driving drum, a take-up spool and a data supply spool, whereby the analog voltages derived from said data is correlated with the depth of a bore-hole.

4. The system according to claim 3 comprising, in addition thereto, means for providing an audio signal, thereby providing correlation with the depth of a bore-hole.

5. The system according to claim 4, wherein said means for providing an audio signal comprises a depth line sensor, an amplifier stage, an audio oscillator, an electronic gate section, a single shot multivibrator, an audio amplifier stage and a speaker system, whereby the amplified electric signal from said line sensor triggers said multivibrator, which in turn gates said audio oscillator into said audio oscillator and said speaker system.

6. The system according to claim 3 having in addition thereto an illuminating means located on said rotating member and second circuit means for relating said induced electrical signal to said illuminating means, whereby said illuminating means are pulsed directly beneath each of said magnetic lines to indicate that said lines are being scanned and detected.

7. The system according to claim 6 wherein said illuminating means comprise at least one electric lamp located a predetermined distance from each of said magnetic sensors.

8. The system according to claim 7 wherein said circuit means comprise a sample hold amplifier for each of said magnetic lines being scanned, a sweep oscillator, scale means for relating each of said magnetic lines to one of said sample hold amplifiers, a diode matrix, and triggering means for said scale means and said sweep oscillator, whereby an electrical signal from a given magnetic line induced in a magnetic sensor triggers the scaling means and also triggers the sweep oscillator, thereby causing the sample hold amplifier related to the given line to sample the voltage amplitude of the sweep oscillator and to produce an analog voltage indicative of the location of said given magnetic line on said data chart.

9. The system according to claim 8 wherein said sample hold amplifier comprises input gating means, a capacitor connected across a hold amplifier, the output of said hold amplifier driving a balance amplifier, the input of said balance amplifier also connected to a zero adjust potentiometer, said potentiometer being connected across a supply voltage, an inverter amplifier driven by said balance amplifier, a center-tapped span adjust potentiometer connected across said inverter amplifier, and an isolation amplifier, said isolation amplifier being driven by the output of said inverter amplifier, whereby a sample voltage from the sweep oscillator is held on said capacitor in conjunction with said hold amplifier until said scale means and said diode matrix cause said input gating means to pass another sample from the sweep oscillator to said hold capacitor, said zero adjust and said span adjust being substantially independent of each other.

10. The system according to claim 8 wherein said second circuit means comprise a first single shot multivibrator having an output substantially of the same duration as the time delay between said at least one magnetic sensor and said electric lamp and a second single shot multivibrator triggered by the output of said first multivibrator, whereby the output of said second multivibrator pulses said electric lamps.

11. In a system for converting magnetic lines on a data chart to analog voltages, means for introducing a variable voltage as a reference voltage to said analog voltages from a magnetic line not on said data chart, and means for indicating on said chart the effective position of said reference voltage.

12. In a system according to claim 11 wherein the means for introducing a variable reference voltage comprises a non-magnetic block member having a reference magnetic line thereon, said block being adjustable to transverse the longitudinal axis of said data chart, said reference magnetic line being substantially parallel to said longitudinal axis of said data chart, and a scanning rotating member having at least one magnetic sensor thereon.

13. In a system according to claim 12 wherein the means for indicating the effective position of said reference voltage comprises illuminating means located on said rotating member at a predetermined distance from said at least one magnetic sensor and a circuit for pulsing said illuminating means which is triggered by an electric signal induced in said magnetic sensor by said reference magnetic line.

14. An amplifier system having a zero adjust and a span adjust substantially independent of each other, comprising a first operational amplifier stage having a variable impedance zero adjust connected to the input of said first amplifier, a second operational amplifier driven by said first amplifier and a variable impedance center-tapped, span adjustment connected across said second amplifier, the output of said system being taken from the movable arm of said variable impedance.

15. The amplifier system according to claim 14 wherein said second amplifier comprises an inverter.

16. A process for converting a magnetic line on a data chart to an analog output voltage comprising:

(a) scanning said chart with a rotating member having at least one magnetic sensor mounted on said member, whereby an electrical signal is induced in said sensor; and (b) converting said electrical signal to an analog voltage having an amplitude indicative of the location of said magnetic line on said chart.

17. The process according to claim 2 including the additional step of causing said rotating member to be traversed along the length of said chart.

References Cited

UNITED STATES PATENTS

| | | | |
|---|---|---|---|
| 1,815,010 | 7/1931 | Pollock et al. | 179—100.2 |
| 2,877,080 | 3/1959 | Eisler et al. | |
| 2,907,621 | 10/1959 | Eisler et al. | |
| 2,910,339 | 10/1959 | Eisler et al. | 346—17 |
| 3,302,210 | 1/1967 | Welsh et al. | |

RODNEY D. BENNETT, *Primary Examiner.*

ROBERT M. SKOLNIK, *Examiner.*

D. C. KAUFMAN, *Assistant Examiner.*

UNITED STATES PATENT OFFICE
CERTIFICATE OF CORRECTION

Patent No. 3,393,403 July 16, 1968

Mike Davis et al.

It is certified that error appears in the above identified patent and that said Letters Patent are hereby corrected as shown below:

Column 8, line 4, claim reference numeral "2" should read -- 16 --.

Signed and sealed this 21st day of April 1970.

(SEAL)
Attest:

Edward M. Fletcher, Jr.
Attesting Officer

WILLIAM E. SCHUYLER, JR.
Commissioner of Patents